United States Patent Office 3,177,077
Patented Apr. 6, 1965

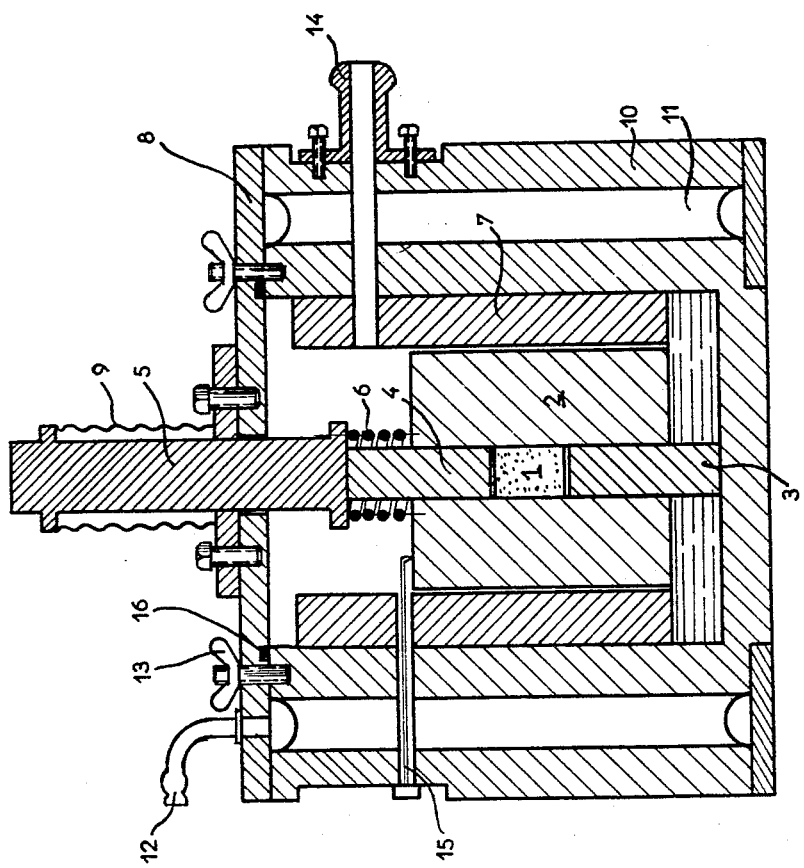

3,177,077
PROCESS FOR THE MANUFACTURE OF COMPACT OR FINE-PORED METALLIC COMPOSITIONS BY AGGLOMERATING PARTICULATE METALS
Charles Eyraud, Lyon, Charles Daneyrolle, Limonest, Maurice Chevreton and Germaine Thomas, Lyon, Pierre Plurien, Palaiseau, and Daniel Massignon, Paris, France, assignors to Commissariat à l'Energie Atomique, Paris, France
Filed Nov. 16, 1959, Ser. No. 853,091
Claims priority, application France, Nov. 18, 1958, 779,397; July 18, 1959, 800,485; Oct. 13, 1959, 807,365
12 Claims. (Cl. 75—201)

The present invention relates to a process for the manufacture of compact or fine-pored metallic compositions by agglomerating particulate metals; it also relates to the use of this process for the manufacture of mixed metal-and-ceramic or metal-and-plastic materials by agglomerating mixtures comprising metallic and non-metallic particles, in the latter case such as those of ceramic or plastic materials.

The present invention also relates to the use of this process in directly forming a porous metallic film of small average pore radius on a large-grained metallic backing.

Known agglomeration processes using metallic powders comprise fritting at a fairly high temperature, or cold compression under very high pressures. When the powders are prepared by reducing metallic compounds, a high temperature is generally used during agglomeration and fine pores, of the order of a hundredth of a micron for example, cannot then be obtained.

The process according to the invention has the advantage of using much lower temperatures and pressures and of giving rise to compositions which may be porous or non-porous, as the operator may desire; the process enables the porosity of the agglomerated composition to be easily regulated. The products obtained exhibit, inter alia, properties which render them highly suitable for use in making up porous barriers for diffusing gases or vapours.

The invention consists in first of all preparing a metal in finely divided form by thermal decomposition of an organic derivative of at least one metal, and then directly agglomerating the metal by compression, without bringing it into contact with the atmosphere or subjecting it to any treatment between preparation and compression, a non-oxidising atmosphere being maintained from the start of preparing the powder until the end of compression.

According to a preferred feature of the invention, the organic metallic compound is decomposed at a sufficiently low temperature for the powder or sponge formed still to contain a substantial proportion of poorly arranged phase.

According to another preferred feature of the invention, the metal obtained by decomposition is also compressed at a temperature lower than that at which the poorly arranged phase disappears. Compression is preferably carried out at a much lower temperature, and in particular equal to or lower than that at which decomposition was carried out.

Compression may, indeed, be carried out at room temperature.

According to the invention, it is essential to decompose the organic metallic compound in a non-oxidising atmosphere; this may be done in vacuo, in an atmosphere of an inert gas, for example nitrogen, argon or neon, or in a reducing atmosphere, for example hydrogen.

The process according to the invention is applicable to an organic compound of one metal or to a mixture of compounds of a plurality of different metals; mixed compounds, such for example as double organic salts of two metals, may also be used. This enables agglomerated compositions, porous or otherwise, to be obtained which consist of a mixture or an alloy of a plurality of metals for example Fe–Ni, Fe–Ni–Co, Cu–Ni, Cu–Ni–Ag etc.

Suitable organic derivatives of metals for use in the process according to the invention are, for example, the organic acid salts of metals such, for example, as nickel, cobalt, zinc, copper, cadmium, gold, or silver, the said salts yielding the metal in the basic state when they are decomposed by heating. Use may also be made of carbonates, carbonyl metals and non-ionic combinations, more particularly chelates or metallic derivatives of amino acids, alcoholates, etc.

The process can be particularly readily applied to the formates and oxalates of nickel, cobalt, copper or silver. For these salts, the decomposition and compression temperates are preferably between 150° C. and 400° C. For example, when it is desired to prepare nickel compositions comprising pores having a radius of the order of 1 to 5 centimicrons, it is preferred to carry out decomposition at between 200° C. and 300° C., and compression at between 20° C. and 200° C. at 2 to 4 tons per cm.$^2$. Larger pores are obtained with higher decomposition temperatures, lower compression temperatures, and/or lower pressures, and vice versa.

The grains of metal are welded to one another by partial re-arrangement of the poorly arranged phase under the effect of compression, and all treatments must therefore combine in maintaining this phase until the instant of compression. In particular, therefore, the metal must be prepared at as low a temperature as possible compatible with the kinetics of decomposition in order to obtain or preserve a certain proportion of the poorly arranged phase. Among organic metallic salts, the ones which decompose at the lowest temperatures are those of low molecular weight; formates and oxalates of nickel, copper, cobalt or silver have been mentioned above by way of example. An increase in the decomposition temperature would encourage re-arrangement of the poorly crystallised phases and assist the crystals to grow, thus contributing to an increase in pore radius in the resulting metallic composition, this being a deleterious effect, since the pores must be very fine, or non-existent in the case of compact products.

Since a poorly arranged and finely divided metal is highly oxidisable, and even pyrophoric, all operations up to compression are preferably carried out in vacuo, or at least in a non-oxidising atmosphere. Decomposition is more rapid in vacuo, and thus does not require such high temperatures, which is advantageous for the reasons set out above.

According to the manner in which the various parameters of the operations are chosen: thermal conditions under which the organic metallic salt is decomposed, conditioning of the atmosphere, time at the end of which agglomeration is produced, temperature and duration of compression, the metallic composition obtained may be either compact or more or less porous.

The process according to the invention is particularly suitable for the production of pieces of complicated shape. Agglomeration in moulds to the desired dimensions eliminates the need for any subsequent machining, such accuracy of production being difficult to obtain by casting.

Another advantageous use is in the manufacture of porous membranes which are particularly suitable for use as membranes for diffusing gases or vapours.

The cold compression of metallic powder obtained by thermal decomposition of an organic salt by the method according to the invention has led to the following facts being established.

(1) With sufficient pressure, generally of the order of 3 tons/cm.$^2$, the crystallites can be made to cohere, while the metallic composition retains a high degree of permeability to gases.

(2) The grains are welded together by a particularly reactive interstitial phase. The smallest amount of air reaching the metallic powder, after decomposition and before compression, makes agglomeration without heating defective or even impossible to carry out.

(3) The presence of the poorly arranged phase is clearly responsible for inter-crystallite welding. In fact, X-ray analysis reveals a large content of poorly arranged phase in the metallic powder before compression, and a very small residual content after agglomeration by compression. Moreover, the compressed metal is not pyrophoric and does not deteriorate in air, or in fluorine, even at a moderately high temperature.

(4) The grains may be welded together with a very good degree of porosity in the whole when agglomeration pressures are not too high.

On the contrary, when the said pressures are increased, agglomeration of the basic grains leads to compact non-porous metal.

In general, pressures of more than 5 tons per cm.$^2$ lead to metallic compositions which are fluid-tight or compact, or exhibit a very small degree of closed porosity which disappears with further increase in pressure; pressures of between 1 and 5 tons per cm.$^2$ lead to porous permeable metallic compositions.

(5) Too great an increase in the decomposition temperature leads to porous metallic compositions having excessive pore radii; the optimum temperature compatible with small-radius pores, when nickel and copper formates are being decomposed, is in the region of 220° C. Decomposition is complete at the end of an hour, with a carbon level of less than 0.1%; in general, the optimum temperature is between 150° C. and 400° C.

(6) Agglomeration is advantageously carried out at any temperature between the said optimum temperature and room temperature.

According to a further feature of the invention, a non-metallic composition in the particulate state may be added to the metallic compound to be decomposed, so that the product obtained after compression is a mixed composition formed by the agglomeration of metallic and non-metallic particles; the mixed material is caused to cohere by virtue of the fact that the poorly arranged phase is partially re-arranged under compression at a moderate temperature.

The conditions of temperature and pressure are the same as when metallic constitutes are used on their own, that is they should be such as to obtain or retain a certain proportion of poorly arranged phase.

The non-metallic constituent or constituents associated with the metallic constituent or constituents may be a ceramic material in the particulate state; this gives a "cermet" which may be used at high temperature, since it has the appropriate characteristics of mechanical resistance to tension and impact, resistance to flow, good behaviour under thermal shock and suitable structural stability; in this mixed material, the ceramic constituent complies with the prescribed thermal conditions, while the metallic constituent imparts the required additional mechanical properties to the material.

Thus, for example, cold compression of the mixture of refractory metallic oxides and metallic powder obtained by thermal decomposition of an organic salt has shown that:

(1) With sufficient pressure, the various constituents can be made to cohere satisfactorily, imparting to the whole a hardness at least equal to that of a material of identical composition obtained by fritting at 900° C.

(2) Grain-to-grain welding is obtained with a certain overall porosity at moderate fritting pressures. If these pressures are increased, grain-to-grain welding leads to a compact material exhibiting greater hardness.

(3) The mechanical resistance of the material obtained depends on the nature of the various constituents and also on their relative proportions. It increases with the proportion of metallic constituent.

(4) Agglomeration may be carried out at any intermediate temperature between that at which the metallic salt decomposes and room temperature.

Mixed materials consisting of metal and plastic material may also be manufactured in accordance with this process; the plastic materials employed are preferably organic high polymers. Mixed materials consisting of nickel-polytetrafluorethylene and copper-polytetrafluorethylene, and which exhibit remarkable mechanical properties can, for example, be prepared in this way.

The various mixed materials consisting of metal and ceramic and metal and plastic material may be porous or compact, according to the values of the following factors: temperature, pressure and duration of compression. In the case of fine-grained porous compositions there is an upper limit to temperature for the reasons indicated above, so that the value of pressure chosen will in practice enable suitable permeability to be obtained.

As indicated above metallic materials or mixed materials consisting of metal and ceramic or metal and plastic material may be manufactured which comprise more than one metallic constituent. In such cases allowance must be made for the fact that the temperatures at which the corresponding metallic compounds decompose may not coincide and the same applies to the most favourable temperature ranges, and to the pressure for cold-welding the metallic grains or welding them at a moderate temperature. In order to avoid these differences it is preferred to choose metals of which there are compounds which will produce the said metals under similar conditions, and the grains of which can be welded together in mutually overlapping ranges of pressure and temperature.

One or more ceramic constituents can also be used in the same mixed ceramic-and-metal material, as can be one or more plastic materials in a mixed plastic-and-metal material.

The metallic compositions obtained by the process according to the invention may be used in the production of porous membranes for use in filtering suspensions and in effecting the separation of gases by gaseous diffusion; for these uses, however, it is preferable to use the following modification, which is also a preferred feature of the invention, so that the porous membrane will exhibit both a high degree of permeability and the best possible properties as regards mechanical resistance. A porous metallic composition is manufactured under the conditions hereinbefore described, and is compressed on a large-pored metallic backing, such as fritted metal for example; the effective radius of the pores in the backing should be of the order of 1 to 150 microns, that is to say of the order of 100 to 10,000 times the effective radius of the pores in the porous layer which is compressed on the said backing; the said backing may, for example, be made of stainless steel, bronze, nickel or copper, or may be a mixed metallic frit.

These same materials may also be used in the form of grids, woven cloths, expanded metal or an electrolytic deposit. Metallic grids produced in this manner are of 25 to 400 mesh.

The fine porous film which covers the backing may be made of the same metal as the latter, or may or may not have a common metallic constituent therewith.

Where a fritted metal is employed as the backing, a suitable thickness for the surface film is, for example, 20 to 100 microns. In such an assembly, a backing a few tenths of a millimetre thick imparts remarkable mechanical resistance to the membrane, and enables the latter to be readily attached to a gas-diffusion cell.

When a grid is used, the membrane obtained has advantageous properties from the mechanical point of view and as regards permeability; if a metal grid has a thickness of the order of 50μ, the total thickness of the membrane (film+backing) may, for example, be from 60μ to 150μ.

The fact that the active portion of the membrane as regards separation by diffusion is thin, improves gas-transit time as compared to porous metal membranes of the same type, without backing, as the latter would have to be of the order of at least 200 microns thick in order to exhibit satisfactory mechanical resistance. The former arrangement, i.e. a fine pored film produced by the method according to the invention supported on a large pored backing gives the advantage of higher gas outputs and less membrane corrosion, which is particularly advantageous when a corrosive gas such as uranium hexafluoride is being diffused.

The porous film produced by compression on the large-pored backing may comprise a non-metallic constituent in addition to the metallic constituent, as hereinbefore stated.

It should be pointed out that by increasing the compression force and using a large-pored fritted metallic backing or a metal grid, a compact metallic composition, which may be highly desirable for certain uses, can be obtained.

According to another important aspect of the invention, the very fine metallic powder, which may or may not be mixed with non-metallic constituents in the finely divided state, can be formed and then compressed in a suitable compression tool on a metallic backing or without backing, a non-oxidising atmosphere being maintained from the start of making up the powder up to the end of compression.

In order that the invention may be more fully understood, one suitable apparatus for carrying out the agglomeration method will now be described, by way of example only, with reference to the accompanying drawing in which the single figure is a vertical section through such apparatus.

The starting material or materials are placed at 1 within a matrix 2 and on the upper face of a lower piston 3, where compression will take place. A piston 4, which has a few grooves hollowed out along its generatrices in order to allow the escape of gaseous reaction products, is placed above the starting materials and within the matrix 2. The piston 4 is fast with a ram 5 and a spring 6 prevents the powder from being compressed before and during decomposition. The matrix, powder and pistons are together placed inside an oven 7, the cover 8 of which is provided with a metal bellows 9 giving a fluid-tight seal between the oven and the ram 5. Water is circulated through a cavity 11 in the aluminium external wall 10 of the oven 7, being introduced through an inlet pipe 12. The cover 8 is attached to the oven 7 by butterfly screws 13 in order to make it easy to open. The interior of the oven communicates with a vane-type pump (not shown) via a spherical union 14. A Chromel-Alumel thermocouple 15 is also provided, the metal junction of the thermocouple being accommodated in a small hole provided in the body of the matrix 2; the thermocouple enables the reaction temperature to be accurately ascertained. A fluid-tight seal is provided by annular packings 16. The whole is placed on the platen of a press (not shown); vacuum is set up and the operations of decomposition and compression are then carried out under suitable thermal conditions.

For the further understanding of the invention, the following examples which describe processes which were carried out in apparatus as illustrated in the figure, are given by way of illustration only.

In these examples, the characteristics of the porous metallic compositions obtained are expressed in terms of the effective pore radius $\bar{r}$, in centimicrons $c\mu$, and the permeability, $\bar{G}$, in mols of air per $cm.^2$ per minute per cm. of mercury pressure difference between the faces of the porous metallic composition.

EXAMPLE 1

Approximately 1.5 gm. of nickel formate powder was placed at 1 on the upper face of the lower piston 3. Vacuum was set up and the powder was heated to 215° C., this temperature was maintained for 1½ hours, the powder was then allowed to cool to 120° C. and compression was carried out at a pressure of 3 tons/$cm.^2$ for one minute; complete cooling was carried out in vacuo before the oven was opened.

A porous metallic composition weighing 473 mgm., and having the following characteristics, was obtained:

Thickness=0.2 mm.

$\bar{r}=2.8$ $c\mu$.

$\bar{G}=370.10^{-7}$

EXAMPLES 2 TO 13

Various examples, carried out in accordance with the same operational procedure as in Example 1, are grouped in Table I below; only the starting materials and the various parameters of decomposition were varied.

This table may be supplemented by the following details:

In Example 2, the diameter of the crystallites, determined by X-rays, was 3 centimicrons. The porous metal disc obtained did not increase in weight in air or in fluorine when cold. The increase in weight was less than 0.2% in fluorine at 200° C.

In Example 10, the compact metallic composition obtained had a density of 7.9.

In Example 11, the compact metallic composition obtained had a density of 8.2 and a thickness of 0.18 mm.; the corresponding weight of the agglomerated metal was 740 mgm.

*Table I*

| Example | Starting Material | Decomposition | | Compression | | Characteristics | |
|---|---|---|---|---|---|---|---|
| | | T in ° C. | Time | T in ° C. | Pressure, T/$cm.^2$ | $\bar{r}$ in $c\mu$ | $\times \bar{G} 10^{-7}$ |
| 2 | Nickel formate | 220 | 1½ h | 150 | 3 | 2 | 265 |
| 3 | | 215 | 1½ h | 150 | 3 | 2 | 265 |
| 4 | | 215 | 1½ h | 150 | 4 | 1.6 | 120 |
| 5 | | 240 | 2 h | 150 | 3 | 2 | 209 |
| 6 | | 300 | 2 h | 150 | 3 | 17 | 850 |
| 7 | | 220 | 2 h | 150 | 3 | 2.1 | 270 |
| 8 | | 220 | 2 h | 100 | 3 | 1.9 | 390 |
| 9 | | 220 | 1½ h | 20 | 3 | 4.8 | 630 |
| 10 | | 350 | 1½ h | 350 | 6 | 0 | 0 |
| 11 | | 380 | 2 h | 380 | 6 | 0 | 0 |
| 12 | Nickel oxalate | 360 | 45 min | 140 | 3 | 1.7 | 87 |
| 13 | Copper formate | 230 | 1½ h | 150 | 2 | 13 | 427 |

EXAMPLE 14

2.4 gm. of an intimate mixture of nickel formate and titanium oxide, giving a nickel titanium oxide ratio of 1 after decomposition, were placed at 1 in the matrix 2 on the lower piston 3, vacuum was set up, and the mixture was heated to 230° C.; this temperature was maintained for 1½ hours, the mixture was then allowed to cool to 150° C., and compression was carried out at a pressure of 3 tons/cm.² for one minute; complete cooling was allowed to take place in vacuo before the oven was opened. The disc obtained weighed 1823 mgm., and was composed of a mixed $TiO_2$–Ni (50/50) material, the diameter being 30 mm., and the effective pore radius 1 $c\mu$. This disc was porous and its permeability $\overline{G}$ to air was $30.10^{-7}$ mols of air/min./cm.² for a pressure difference of 1 cm. of mercury on the two sides of the disc. The Vickers micro-hardness for an impression diagonal of $30\mu$ was 40 kg./mm².

EXAMPLE 15

The initial mixture and the conditions of decomposition were identical with those in Example 14. Compression was carried out at 150° C., at 4.3 tons/cm². The characteristics of the material obtained were as follows:

Disc of $TiO_2$–Ni (50/50), virtually compact.
Weight: 1,884 mgm.
Diameter: 30 mm.
Vickers micro-hardness for an impression diagonal of $30\mu$: 100 kg./mm².

EXAMPLE 16

The initial mixture consisted of alumina and nickel formate and was treated exactly as described in Example 15.

The characteristics of the product obtained were as follows:

Disc of $Al_2O_3$–Ni (50/50), virtually compact.
Weight: 1,083 mgm.
Vickers micro-hardness for an impression diagonal of $30\mu$: 36 kg./mm².

By way of comparison, the Vickers micro-hardness of a sample of $Al_2O_3$–Ni cermet (50/50) obtained by fritting at 900° C. was 25 kg./mm.² under the same conditions.

EXAMPLE 17

The initial mixture consisted of alumina and nickel formate, giving ⅔ nickel after decomposition of the formate.

Decomposition was carried out as described in Example 1; compression was carried out at 3 tons/cm.² at 150° C.

The characteristics of the product obtained were as follows:

Disc of $Al_2O_3$–Ni (⅓ $Al_2O_3$, ⅔ nickel)
Weight: 1,145 mgm.
$\bar{r}$: 1 $c\mu$.
$\overline{G}$: $70.10^{-7}$.
Vickers micro-hardness for an impression diagonal of $30\mu$: 43 kg./mm.².

EXAMPLE 18

The initial mixture, consisting of alumina and nickel formate, was identical with that in Example 17. After decomposition, compression was carried out at 150° C., at 4.3 tons/cm.².

The characteristics of the product obtained were as follows:

Disc of $Al_2O_3$–Ni (⅓ $Al_2O_3$, ⅔ nickel)
Weight: 1,165 mgm.
Diameter: 30 mm.
$\bar{r}$: less than 1 $c\mu$
$\overline{G}$: $30.10^{-7}$
Vickers micro-hardness for an impression diagonal of $30\mu$: 61 kg./mm.².

EXAMPLE 19

A mixture of nickel formate and polytetrafluorethylene powder, which was such that after decomposition of the formate there was a 50/50 mixture by volume of the two constituents, was decomposed as described in Example 14. Compression was carried out at 3 tons/cm.², at 150° C. A solid compact disc was obtained.

EXAMPLE 20

5.25 gm. of nickel formate was decomposed in vacuo at 350° C. for 45 minutes, and then compressed in vacuo at a pressure of 6 tons/cm.², at 350° C., for one minute; a nickel disc weighing 1.280 gm., of zero permeability and having a density of 8.1 was obtained; this exceptional density for a metallic conglomerate must be considered as being a particular feature of the process according to the invention.

EXAMPLE 21

An intimate mixture of 2 gm. of nickel formate and 0.52 gm. of copper formate was made up; the internal diameter of the matrix in which the mixture was placed, was 25 mm. Decomposition was carried out for two hours at 220° C.; compression is carried out in vacuo at 3 tons/cm.², for one minute at 120° C.

The porous disc obtained exhibited the following characteristics:

$\bar{r}=3.3$ $c\mu$.
$\overline{G}=460\times10^{-7}$

This disc had a composition approximating to that of "Monel" metal, and exhibited, like that metal, very good resistance to corrosion by corrosive fluids.

EXAMPLE 22

A porous membrane was made up by forming a porous nickel film on a large-pored backing consisting of a 140-mesh grid of woven nickel wires; the diameter of the matrix was 30 mm.; the weight of nickel formate used in forming the film was 3 gm. This salt was decomposed for 1 hour at 230° C. and the powder was then compressed on the nickel grid at 2 tons/cm.² in hydrogen, for one minute at 115° C.

The membrane exhibited the following characteristics:

$\bar{r}=3.4$ $c\mu$.
$\overline{G}=280\times10^{-7}$

EXAMPLE 23

A porous membrane was manufactured as described in Example 22; but in this case the backing consisted of a fritted stainless steel disc ten millimetres in diameter and 1.5 millimetres thick, the average diameter of the fritted grains being $30\mu$. The associated nickel film was obtained from 3 gm. of nickel formate decomposed for one hour at 230° C. followed by compression at 3 tons/cm.², at 110° C.; the porous membrane obtained exhibited the following characteristics:

$\bar{r}=3$ $c\mu$.
$\overline{G}=310\times10^{-7}$

EXAMPLE 24

A porous membrane was made up as described in Example 22; in this case the backing was a fritted nickel disc 30 mm. in diameter and 0.7 mm. thick, the size of the fritted grains being $25\mu$. The fine-pored film was obtained from 3.5 gm. of nickel formate decomposed for one hour at 230° C. and then compressed at 3 tons/cm.², at 120° C.; the characteristics of the porous membrane were as follows:

$\bar{r}=2.8$ $c\mu$.
$\overline{G}=350\times10^{-7}$

EXAMPLE 25

A mixture of copper oxalate and polytetrafluorethylene powder, which was such that after decomposition of the oxalate there was a 50/50 mixture by volume of the two constituents, was decomposed for 55 minutes at 360° C., the mixture was allowed to cool to 130° C., and then compressed at the latter temperature, under a pressure of 3.5 tons/cm.$^2$; a solid compact copper-polytetrafluorethylene disc was obtained.

We claim:

1. In a process for making agglomerated metallic compositions the steps of subjecting a finely divided metal compound containing carbon in its molecule at temperatures from 150° to 400° C. to thermal decomposition in an inert atmosphere and then compressing the resulting metal powder in said inert atmosphere at a temperature not above the temperature of thermal decomposition and at a pressure of above about 1 ton/cm.$^2$.

2. In a process as described in claim 1 the metal compound being selected from the group consisting of compounds of nickel, copper, cobalt, cadmium, gold, silver and combinations thereof.

3. In a process as described in claim 1 the metal compound being selected from the group consisting of formates, oxalates, carbonates, chelates, amino acids, carbonyl metals, alcoholates and combinations thereof.

4. In a process as described in claim 1, the further step of adding at least one non-metallic constituent homogeneously to the metal compound.

5. In a process as described in claim 4, the non-metallic constituent being a refractory ceramic material.

6. In a process as described in claim 4, the non-metallic constituent being polytetrafluorethylene.

7. In a process as described in claim 1, the further step of compressing the resulting metal powder on a sintered metal backing having an effective pore radius of between one and one hundred and fifty microns.

8. In a process as described in claim 1, the further step of compressing the resulting metal powder on a metal grid backing of from 25 to 400 mesh.

9. In a process as described in claim 7, the metallic backing being selected from the group consisting of stainless steel, bronze, nickel, copper and combinations thereof.

10. In a process as described in claim 8, the metal grid backing being selected from the group consisting of stainless steel, bronze, nickel, copper and combinations thereof.

11. In a process as described in claim 7, the step of conducting thermal decomposition of the metal powder on the metal support and compressing the metal powder at pressures less than 5 tons/cm.$^2$.

12. In a process as described in claim 8, the step of thermally decomposing the metal powder on the metal support and then compressing the metal powder at pressures less than 5 tons/cm.$^2$.

References Cited by the Examiner

UNITED STATES PATENTS

| | | | |
|---|---|---|---|
| 2,287,663 | 6/42 | Brassert | 75—211 |
| 2,522,679 | 9/50 | Kroll | 75—211 |
| 2,681,375 | 6/54 | Vogt | 29—182.3 |
| 2,776,887 | 1/57 | Kelly et al. | 75—211 |
| 2,833,847 | 5/58 | Salauze | 29—182 |
| 2,893,859 | 7/59 | Triffleman | 75—201 |
| 2,894,281 | 7/59 | Pouse et al. | 18—16 |
| 2,918,699 | 12/59 | Hall | 18—16 |
| 2,979,400 | 4/61 | Movwen | 29—182.2 |

FOREIGN PATENTS

| | | | |
|---|---|---|---|
| 419,953 | 11/34 | Great Britain | 75—211 |
| 610,514 | 10/48 | Great Britain | 75—200 |

OTHER REFERENCES

Goetzel: Treatise on Powder Metallurgy, vol. I, Interscience Publisher, Inc., New York, 1959, pp. 49–53.

Goetzel: Treatise on Powder Metallurgy, vol. 2, Interscience Publishers, Inc., New York, 1959, pp. 479 and 480.

CARL D. QUARFORTH, *Primary Examiner.*

ROGER L. CAMPBELL, WILLIAM G. WILES,
    *Examiners.*